Patented Oct. 12, 1937

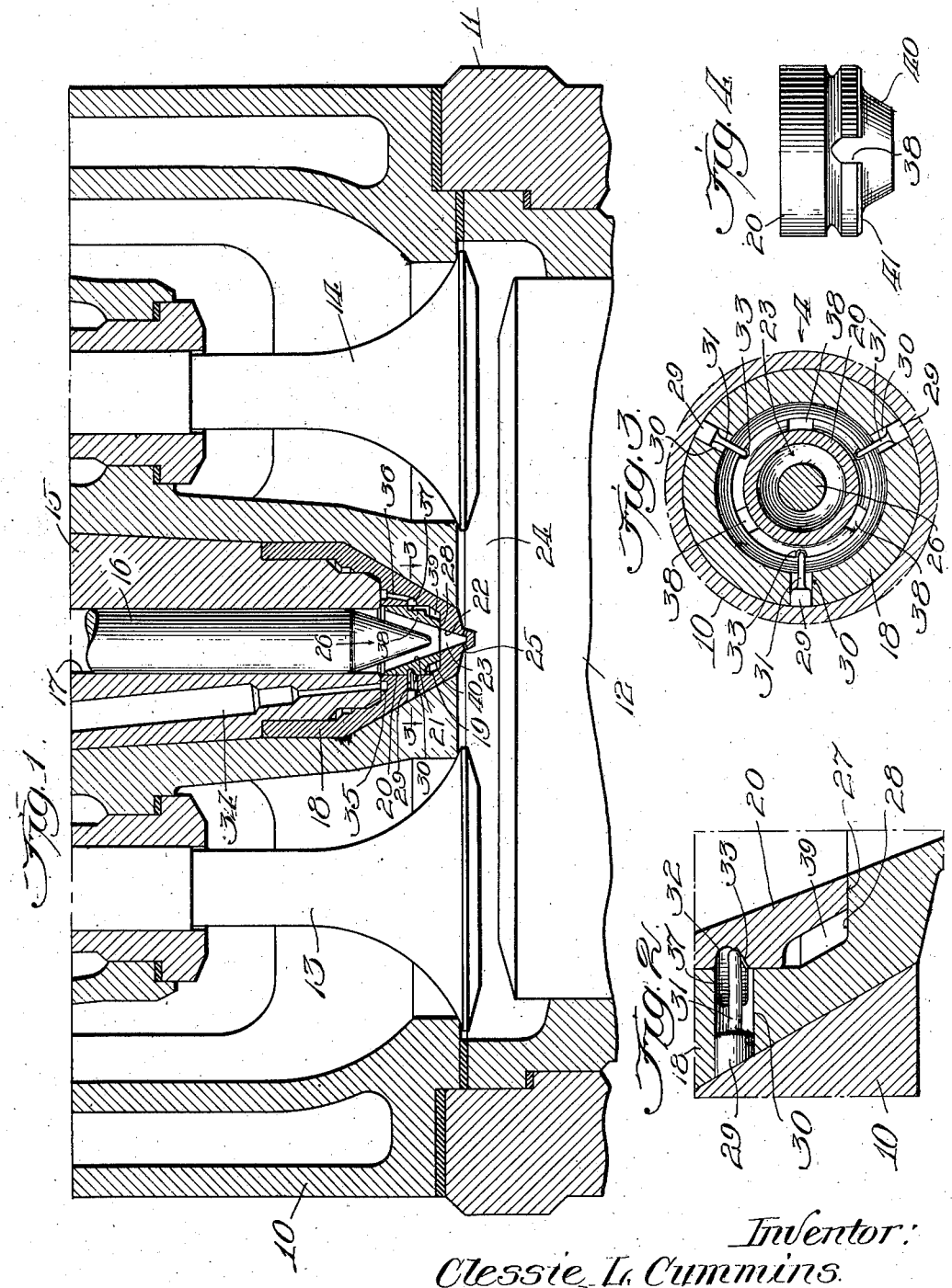

2,095,435

UNITED STATES PATENT OFFICE 2,095,435

OIL ENGINE

Clessie L. Cummins, Columbus, Ind., assignor to Oil Engine Development Company, Columbus, Ind., a corporation of Indiana Application May 23, 1936, Serial No. 81,403

8 Claims. (Cl. 123—33)

My invention relates to oil burning engines of the general type wherein the fuel is burned by the heat of the air compressed by the piston within the combustion chamber of the cylinder and is more particularly concerned with injecting devices for such engines.

The principal operative features of the present invention are generally similar to the injector constructions disclosed in my United States Letters Patent Nos. 1,561,913 and 1,762,653, as regards the reciprocable mounting of an injecting plunger in a mixing or vaporizing chamber which communicates with the combustion space of the cylinder through a plurality of fuel ports. During the suction stroke of the piston, air is drawn into the combustion space and the plunger is slowly withdrawn to permit a charge of fuel oil to enter the vaporizing chamber, while during the compression stroke, heated air is driven through the ports into the vaporizing chamber where the oil is entrained and thoroughly mixed with the air. Near the beginning of the power stroke, the plunger is forced into the vaporizing chamber and ejects the mixture into the combustion space.

In the foregoing construction, the openings through which the fuel passes into the vaporizing chamber are located adjacent the ports communicating with the combustion space to insure a thorough commingling of the fuel and the air entering the vaporizing chamber through the ports during the compression stroke of the piston. In addition to ejecting the mixture, the injecting plunger when in fully advanced position also seals the fuel openings and thus interrupts the flow of fuel into the mixing chamber. In small engines, such as those having a bore of approximately four inches and less, the securing of an effective seal becomes more difficult because of the reduced size of the parts involved and accordingly the limited areas available for sealing purposes. For example, in an engine having a bore of 3¾ inches, the base diameter of the conical end of the injecting plunger is about $\frac{7}{16}$ of an inch and this base subtends an angle of about 40 degrees at the pointed end. Accordingly, with an injecting structure as disclosed in the above noted patents and assuming an engine size just noted, it is clear that, if the injecting plunger fails to seat accurately for any reason, the fuel delivery opening will not be completely sealed off and hence, even with the injecting plunger in fully advanced position, some drip may be present at the ejecting ports. This condition will obviously result in a reduction in fuel economy, carbonization of the ejection ports, crankcase dilution and a smoky exhaust.

It is therefore the principal object of my invention to devise an oil engine having an injecting device which retains the advantage of the earlier construction as regards the intimate commingling of the air and fuel oil in the mixing chamber, while also providing for an absolute seal of the oil delivery port at the proper time.

A further object is to provide an injecting structure for an oil burning engine in which interruption of the oil flow is provided by the contacting of surfaces transversely disposed to the axis of the injecting plunger whose movement causes their engagement, thus insuring an effective seal of the oil port.

These and further objects of my invention will be set forth in the following specification, reference being had to the accompanying drawing, and the novel means by which said objects are effectuated will be definitely pointed out in the claims.

In the drawing:

Figure 1 is a sectional elevation of a portion of the cylinder of an oil burning engine showing the piston substantially at the end of its compression stroke, and the relation thereto of the fuel injector and nozzle, the inlet and exhaust valves, and the hydraulic valve element utilized to interrupt the fuel flow into the mixing chamber.

Fig. 2 is an enlarged sectional elevation of a portion of the lower end of the injecting device showing the manner in which the hydraulic valve is yieldingly retained in sealing position.

Fig. 3 is an enlarged section taken along the line 3—3 in Fig. 1, looking in the direction of the arrows.

Fig. 4 is an elevation of the hydraulic sleeve valve.

Referring to the drawing, the numeral 10 designates part of a cylinder head mounted in the usual manner on the top of a cylinder 11 which is provided with a reciprocating piston 12 of a four cycle engine of the Cummins-Diesel type, to which, for the purpose of illustration, I have shown the preferred embodiment of my invention applied. The usual air inlet and exhaust valves 13 and 14, respectively, are mounted for reciprocating movement on opposite sides of the cylinder axis according to the general relationship shown in Fig. 1.

While the injecting device hereinafter described is more particularly intended for use with a Cummins type of engine where a separate mixing chamber is provided for preconditioning the fuel charge by mixing and vaporization with and by a mass of air delivered into the mixing chamber during the compression stroke of the piston, the invention is not to be considered as limited in this respect since the invention generally comprehends the positive cut-off of the fuel supply by the injecting plunger at indicated times during the operation of the engine.

In the form shown in the drawing, the fuel injector comprises a body member or plug 15, an injecting plunger 16 operable in a central bore 17 in the plug, and a cup-shaped member 18 fitting over the inner or combustion space end of the plug. The member 18 is provided with a cylindrical bore 19 that is in alignment with and constitutes substantially a continuation of the bore 17 and slidably mounted in the bore 19 is a sleeve valve 20.

The inner surface of the valve 20 tapers similar to the lateral surface of the frustum of a cone, as indicated by the numeral 21, and when the valve is in the position shown in Fig. 1, the surface 21 provides a smooth continuation of the surface of the inverted conical recess 22 provided in the lower end of the member 18. The interiors of the valve and the lower portion of the member 18 therefore define a conical mixing and vaporizing chamber 23 that communicates with the combustion space 24 of the cylinder through a series of apertures 25. The apertures 25 may be located and shaped to discharge any arrangement and shape of spray into the combustion space 24. Ejection of the charge in the chamber 23 through the apertures 25 is afforded by the conical end 26 of the plunger 16 which is shaped generally to conform to the shape of the mixing chamber.

When the valve 20 is in the position illustrated in Fig. 1, its end face 27 bears against a valve seat 28 which is transversely disposed to the axis of the plunger 16 for a purpose hereinafter explained. The valve is normally urged into contact with the seat by means of a plurality of springs, each of which, in the present construction, takes the form of a cylindrical piece of spring steel rod 29 that is mounted in a hole 30 provided in the member 18, it being understood that there are a number of such holes equispaced in the member around the valve. The inner end of each rod is reduced to form a spring finger 31 that extends into an annular groove 32 provided in the valve. The groove 32 is preferably provided with a number of shallow recesses 33 which receive the indicated ends of the spring fingers 31 and prevent inadvertent circumferential displacement of the valve.

The charge of liquid fuel is led from an external source through a passage 34 provided in the plug 15, the lower or inner end of this passage registering with an annular groove 35 provided in that face of the member 18 which abuts against the lower end of the plug. From this groove depends a plurality of conduits 36, only one of which is illustrated in Fig. 1, although it will be understood that there are a number of such conduits spaced around the member 18 and the lower ends of these conduits terminate in an annular channel 37 that opens inwardly towards the cylindrical bore 19. The channel 37 registers with the upper ends of a plurality of vertical and circumferentially spaced channels 38 whose lower ends are in communication with an annular space 39. The channels 38 serve a further purpose in addition to acting as conduits for the passage of the fuel oil in that when the injecting device is assembled, the sleeve valve is inserted in the bore 19 with the channels 38 in registration with the ends of the spring fingers 31, after which the valve is rotated to place the indicated ends in the shallow recesses 33. The annular fuel space 39 is defined by the adjacent interior wall of the member 18 and also by the reduced, tapered end 40 of the sleeve valve and the shoulder 41 formed by such reduction, the purpose of so arranging the lower end of the sleeve valve being explained more particularly hereinafter.

In describing the manner in which my improved injecting device coacts with the remaining portions of the oil engine structure, it will be assumed that the piston 12 has drawn a charge of air into the combustion chamber 24 and that the piston is located at some point below that illustrated in the drawing, but is moving upwardly on the compression stroke. It will be further understood that, during the suction stroke of the piston, a charge of fuel oil under pressure, established either by a gravity head or by a pump, is forced into the mixing chamber 23. This charge initially reaches the annular fuel space 39 by way of the passage 34, annular groove 35, conduits 36, annular channel 37 and vertical passages 38. Due to the shape of the lower end of the sleeve valve and the fact that the oil is under pressure, a lifting effect is exerted on the sleeve valve and the strength of the spring fingers 31 is so adjusted relative to the oil pressure as to permit this movement. Accordingly, the lifting of the valve 20 creates an annular fuel delivery port defined by the face 27 and seat 28. It will be further understood that the lifting of the valve 20 is further permitted by a slow elevation of the plunger 16 during the suction stroke of the piston.

During the compression stroke, the temperature of the air increases rapidly and air is driven into the mixing chamber 23 to thoroughly mix with and vaporize the oil therein, as described more particularly in the above noted patents. Shortly before the piston reaches top center on its compression stroke, the plunger 16 is driven downwardly by any suitable means to eject the entire mixture of fuel and air from the chamber 23 into the combustion space.

The same movement of the plunger also returns the sleeve valve to the position shown in Fig. 1, that is, one in which the supply of fuel is interrupted by the firm, sealing contact of the face 27 and seat 28. This sealing engagement will be obtained, notwithstanding that there may be a slight discrepancy or misfit in the contact of the pointed end of the plunger with the tapered interior of the sleeve valve and the seal is further insured by reason of the fact that the engaging faces of the valve and member are transversely disposed to the axis of the valve, thus providing for the most effective use of the pressure applied by the plunger. Any drip which might otherwise occur at the apertures 25 is therefore completely prevented, while still retaining the annular fuel port sufficiently close to the apertures to insure a thorough mixture and entrainment of the oil with the air and obviating any tendency towards "stratification" of the mixture in the mixing chamber, which would otherwise result in a delivery into the combustion chamber of some of the fuel in a liquid condition, and cause momentary high pressures, late combustion of part of the charge, a decrease in power, carbon deposits and an unequal distribution of the charge in the combustion chamber. The present construction is entirely free of the foregoing operating faults and retains the advantage of the structures disclosed in the noted patents as regards a thorough pre-conditioning of the fuel-air mixture in the vaporizing chamber.

It will be understood that the spring fingers are sufficiently strong to maintain the sleeve valve against the seat 28 during the period of the cycle when the plunger is retracted but the valve is not subjected to fuel pressure. Slow drip of the fuel is thereby prevented during this operative phase of the engine.

I claim:

1. An injecting device for an oil burning engine comprising in combination a body having a fuel chamber provided with one or more ejection ports and a passage for supplying the chamber with fuel under pressure, a valve adapted to close the passage and operable by the fuel pressure to open the passage, and an injecting plunger reciprocable in the body to alternately provide for the delivery of fuel to the chamber and to discharge the fuel through the ports, the plunger during its discharging movement engaging the valve to close the passage.

2. An injecting device for an oil burning engine comprising in combination a hollow body, a sleeve valve operable within the body and forming therewith a fuel chamber having one or more ejection ports, the body also including a passage for supplying the chamber with fuel under pressure and the valve being adapted to close the passage and shiftable by the fuel pressure to open the passage, and an injecting plunger reciprocable in the body to alternately provide for the delivery of fuel to the chamber and to discharge the fuel through the ports, the plunger during its discharging movement engaging the valve to close the passage.

3. An injecting device for an oil burning engine comprising in combination a hollow body having an interior, annular valve seat, a sleeve valve operable within the body and forming therewith a fuel chamber having one or more ejection ports, the body also including a passage terminating at the seat for supplying the chamber with fuel under pressure and the valve being adapted to engage the seat to close the passage and shiftable by the fuel pressure to open the passage, and an injecting plunger reciprocable in the body to alternately provide for the delivery of fuel to the chamber and to discharge the fuel through the ports, the plunger during its discharging movement engaging the valve to seat the same.

4. An injecting device for an oil burning engine comprising in combination a body having an elongated bore and an inwardly extending, annular shoulder therein defining a valve seat, a reduced portion of the bore extending beyond the seat to form a pocket having one or more ejection ports, a sleeve valve slidable in the bore and forming with the pocket a fuel chamber, the exterior of the valve being reduced to provide an external annular shoulder and an annular space between the valve and the adjacent portion of the bore, a passage adapted to connect the space with a source of fuel under pressure and the valve being adapted to engage the seat to close the passage and shiftable by the fuel pressure acting against the external shoulder to open the passage, and an injecting plunger reciprocable in the bore to alternately provide for the delivery of fuel to the chamber and to discharge the fuel through the ports, the plunger during its discharging movement engaging the valve to seat the same.

5. An injecting device for an oil burning engine comprising in combination a body having a fuel chamber provided with one or more ejection ports and a passage for supplying the chamber with fuel under pressure, a valve biased to close the passage and operable by the fuel pressure to open the passage, and an injecting plunger reciprocable in the body to alternately provide for the delivery of fuel to the chamber and to discharge the fuel through the ports, the plunger during its discharging movement engaging the valve to close the passage.

6. In an oil burning engine, the combination of a cylinder, a piston operable therein, a fuel injecting device comprising a mixing chamber having a supply port communicating with a source of liquid fuel under pressure and one or more ejection ports providing communication with the combustion space of the cylinder and through which air is forced during the compression stroke of the piston to mix with fuel delivered into the chamber, said openings being located relatively close to said supply port to insure a thorough commingling of the air and fuel, a valve mechanically actuated to close the supply port and hydraulically actuated by the fuel pressure to open the supply port, and an injecting plunger retractible in the chamber to provide for the delivery of fuel thereto and advanceable to discharge the mixture through the ejection ports into the cylinder, the plunger engaging the valve to close the same when in advanced position.

7. In an oil burning engine, the combination of a cylinder, a piston operable therein, a fuel injecting device comprising a hollow body projecting into the cylinder and having an internal annular valve seat, a sleeve valve operable within the body and forming therewith a mixing chamber for receiving fuel charges and having one or more ejection ports providing communication with the combustion space of the cylinder, the body also including a passage terminating at the seat for supplying the chamber with fuel under pressure and the valve being adapted to engage the seat to close the passage and shiftable by the fuel pressure to open the passage, air being forced through the ports during the compression stroke of the piston and the ports being located relatively close to the valve seat to insure a thorough commingling of the air and fuel, and an injecting plunger reciprocable in the body to alternately provide for the delivery of fuel to the chamber and to discharge the fuel-air mixture through the ports, the plunger during its discharging movement engaging the valve to seat the same.

8. An injecting device for an oil burning engine comprising in combination a body having a fuel chamber provided with one or more ejection ports and a passage for supplying the chamber with fuel under pressure, a valve, spring elements for shifting the valve to close the passage, the valve being operable by the fuel pressure to open the passage, and an injecting plunger reciprocable in the body to alternately provide for the delivery of fuel to the chamber and to discharge the fuel through the ports, the plunger during its discharging movement engaging the valve to close the passage.

CLESSIE L. CUMMINS.